United States Patent [19]

Ciccarelli

[11] Patent Number: 6,009,422
[45] Date of Patent: Dec. 28, 1999

[54] SYSTEM AND METHOD FOR QUERY TRANSLATION/SEMANTIC TRANSLATION USING GENERALIZED QUERY LANGUAGE

[75] Inventor: Steven Matthew Ciccarelli, Ashburn, Va.

[73] Assignee: International Business Machines Corporation, Armonk, N.Y.

[21] Appl. No.: 08/980,156

[22] Filed: Nov. 26, 1997

[51] Int. Cl.$^6$ .................................................. G06F 17/30
[52] U.S. Cl. .................................................. 707/4; 707/10
[58] Field of Search ................................... 707/4, 10, 102; 395/200.3, 200.31, 200.32, 200.33, 200.47, 200.48, 200.49

[56] References Cited

U.S. PATENT DOCUMENTS

| | | | |
|---|---|---|---|
| 5,408,652 | 4/1995 | Hayashi et al. .............................. | 707/1 |
| 5,416,917 | 5/1995 | Adair et al. .............................. | 395/500 |
| 5,590,319 | 12/1996 | Cohen et al. .............................. | 707/4 |
| 5,596,744 | 1/1997 | Dao et al. .............................. | 395/610 |
| 5,634,053 | 5/1997 | Nobel et al. .............................. | 395/604 |
| 5,655,116 | 8/1997 | Kirk et al. .............................. | 707/1 |

OTHER PUBLICATIONS

Ballesteros et al., "Phrasal Translation and Query Expansion Techniques for Cross–Language Information Retrieval",SIGIR 97, ACM, 1997.

*Primary Examiner*—Thomas G. Black
*Assistant Examiner*—John C. Loomis
*Attorney, Agent, or Firm*—Joseph C. Redmond, Jr.; Steven J. Meyers; Morgan & Finnegan,LLP

[57] ABSTRACT

An information retrieval system and method translates a single search request or query across heterogenous databases independent of the database search grammar(s). A client uses a process to express the query in a powerful programming language, i.e., Generalized Query Language (GQL) which has a wide variety of operators to precisely specify the conditions of the query and enable a fused response to be provided by the databases to the query. The process translates the query into phrases contained in a GQL and constructs a complex search query which bridges the gap between the query and the low level of functionality provided in search engines associated with the databases. A search broker receives the GQL query and using a process (i) checks for syntax errors; (2), if correct, parses the complex query into individual search or partial queries and associated logical operations, and (3) forwards the partial queries and operations to the database search engines. Each search engines translates the partial queries into database search grammar for searching purposes and retrieves search information in the form of a "HitList" related to the query. Each search engines combines the "HitList" in accordance with the operations associated with the partial queries and any constraints specified in the query to generate a search result having a format common in appearance with other search engine results which serves as a fused response from the heterogenous databases.

20 Claims, 6 Drawing Sheets

SYSTEM AND METHOD FOR QUERY TRANSLATION/SEMANTIC TRANSLATION USING GENERALIZED QUERY LANGUAGE

BACKGROUND OF THE INVENTION

1. Field of Invention

This invention relates to information retrieval systems and methods of operation. More particularly, the invention relates to a system and method for generating a single search query for multiple, dissimilar heterogeneous search engines from a client station in a distributed information system.

2. Background Discussion

In the prior art, many information retrieval systems require custom code to translate a given search question into individual target search grammar. Such systems have been handicapped by programming language which does not address general purpose search and retrieval or the systems are tied to a specific commercial product which supports only the features of those products and not a full range of desired capabilities. What is needed is a system and method operation to generate a single query to reach and be processed by a large set of heterogeneous search engine products and then have the search results returned as a single, fused list of relevant information. More specifically, what is needed is to provide a client with a set of object classes which provide a template to perform required translations. The entire translation process is templated so that the process can logically be driven by altering a run-time configuration file rather than writing new code. Where code is required, the code may be inserted via a run-time binding to a shared object allowing a translation product to ship as a single, universal version.

SUMMARY OF THE INVENTION

An object of the invention is an information and retrieval system and method of operation in which a single query may be applied to multiple, dissimilar heterogeneous search engines for generating a fused response from multiple, heterogeneous data bases.

Another object is an information retrieval system and method of operation using an improved programming language for communicating and exchanging data among multiple, dissimilar, heterogeneous search engines.

Another object is an information retrieval system and method of operation in which an improved programming language uses text and fielded-search constructs into a single grammar applicable to multiple, dissimilar, heterogeneous search engines and data bases.

These and other objects, features and advantages are in an information retrieval system method in which a client expresses the query in a programming language which has a variety of operations to precisely specify the conditions of the query and enable a fused response to be provided from the data bases to the query. A client station translates the query into phrases contained in the programming library and constructs a complex search query which bridges the gap between the query and the low level of functionality provided in search engines associated with data bases. The query is transmitted to a search broker which checks the query for syntax errors; parses the associated query into individual search or partial queries and associated logical operation if the search syntax is correct and forwards the partial queries to agent stations for distribution to data base search engines. Each search engine translates the partial queries into database search grammar for searching purposes and retrieves search information in the form of a "Hit List" related to the query. Each search engine combines the "Hit List" in accordance with logical operations associated with a partial query and any constraints specified in the query to generate a search result having a common format appearance with other search engines. The agent station combines and forwards the "Hit List" results to the broker station. A fused response is generated and forwarded to the requesting client station by the broker station as a single response from the heterogeneous, dissimilar multiple databases.

DESCRIPTION OF DRAWING

The invention will be further understood from a following detailed description of the preferred embodiment, taken in conjunction with an appended drawing, in which.

DESCRIPTION OF PREFERRED EMBODIMENT

Before describing the system and processes shown in FIGS. 1–4, a description will be provided for a program language termed "Generalized Query Language" (GQL) used in implementing query translation and semantic translation for multiple, dissimilar, heterogenous search engines in an information retrieval system installed in a distributed information system, for example, the Internet.

GQL and Search Construction

GQL is a computer search language designed to provide maximum search flexibility when specifying a potentially complex conditions which data objects must meet in order to be identified as candidates for return from a query operation. GQL is what is known as a "prefix" grammar. Unlike traditional math grammars, which are infix grammars, prefix grammars place the operator to the far left of a set of operands. For instance, one plus two plus three in an infix grammar is written as: 1+2+3. In a prefix grammar, the same equation would be written (+1 2 3). The latter does take some getting used to for people, but is much easier for a computer to use and process. GQL is not meant to be particularly friendly to users, however, but to accurately and correctly convey the search information from the client machine to the servers which will process it. However, GQL is intentionally designed to provide as much functionality in constructing searches, with the knowledge that few if any commercial engines will be able to provide the total specified functionality. A HitList library is included in GQL and designed to provide additional functionality that search engines might lack.

The language is broken into five parts. Each part addresses a slightly different element of search condition construction. The parts are: Simple tokens, Fielded constructs, Boolean constructs, Proximity constructs, and Concept constructs. Each of these will be discussed in detail.

Simple Tokens

A simple token is the most basic item in a search. In its simplest form, it consists of a single word. Thus, the simplest GQL query is a single word in double quotes. But a token can be more specific than this. There are 'attributes' which can be added to a token to specify additional search engine functionality which need to be applied to the search token prior to being processed by the database. These include but are not limited to:

Stem

Any grammar suffixes are removed from the search term prior to searching. Thus, Runner or Running becomes Run. Be careful of applying this Stemming Rule to proper nouns to which the rules of stemming do not apply. "Lansing", for instance, as in Lansing, Mich., will likely become "Lanse" and result in no database hits. Stemming is performed first if specified in the search.

Exact

Any search terms specified must match as a whole word, exactly as specified. Thus, "runner" would match only that word, not "run" and not "runners".

Weight

The relative importance to apply to a search term (or other construct, as we will see later). Weight allows some words to be more important than others. Weight helps if a query consists of several terms which are commonly found and one or more others which are highly indicative of what one is searching for. For example, let's say that one is searching for information about the Master's Golf Tournament. Some reasonable search term might be "masters", "golf", "tournament", "PGA". Of these, Augusta and PGA are probably most useful, but only in conjunction with the others. Still, the search is not looking for just any golf tournament, but only one that occurs in Augusta and is run by the PGA. So Golf and Tournament would be much less important than the other two words.

Fuzzy

This flag tells the database engine that it is allowable to not precisely match the search term, but match alternative forms of that term. Many engines employ Thesauri or fuzzy word finding algorithms to provide this feature directly, although it is not always desired for all terms.

Case

There are times when the case of terms matters during the search, typically when acronyms or proper names are being used. Clearly "caterpillar" has a different meaning than "Caterpillar" the construction equipment company.

Wild

If this attribute of the token is set, question marks contained within the token are replaceable with a single character while all asterisk characters match zero or more characters.

Simple Token Examples

The general syntax for a Token is one of "search term" or (TOKEN [attribute list] "search term") (Token :stem :exact :weight "50" :fuzzy :case :wild "Hello")

Fielded Constructs

Clients formulating a search may wish to restrict finding a pattern to a specific region of a document. For instance, if you are looking for "A Christmas Carol" by Charles Dickens, you would want documents in which Dickens was contained in the "author" field, rather than elsewhere which might retrieve a book about that author. In order to support this function, GQL provides a set of Fielded Operators which define specific relationships between search tokens and named regions of documents.

Text Fielded Operators

A certain set of fielded operators work only if the fields contain text. The general syntax of these are (<text_fielded_operator>[attributes]<expression>). Currently, the only allowable attribute is Weight, which allows one to specify the weight of this expression relative to its siblings in the parse tree. The GQL text operators are:

Start asks that documents match if the specified express is the beginning of the field. Thus (START "Author" "Louis") would match an author field of Louis Carrell, but not Jerry Louis.

End asks that documents match if the specified expression is the end of the field. Thus (END "Author" "Louis") would match an author field of Jerry Louis, but not Louis Carrell.

In asks that documents match if the specified expression is contained somewhere in the field. Thus (IN "Author" "Louis") would match both Louis Carrell and Jerry Louis.

Eaual asks that documents match if the specified expression matches the field in its entirety. Thus, (Equal "Date" "19970101") would only match documents which have a date field of Jan. 1, 1997.

Ordinal Fielded Operators

A certain set of fielded operators are used specifically when dealing with ordinal fields, or fields which contain ranges of values such as numbers and dates. These operators are used to determine if values are greater or lesser than some others. There are four such operators in GQL that take a field name and a single value. These are: Less than, Greater than, Less than or equal to, and Greater than or equal to. These are commonly supported comparisons and don't really require additional explanation.

There are also two operators which require two values. These are: Between Inclusive and Between Exclusive. They test the contents of a given field against a range of values rather than a single value. For example, Date of Publication in January, 1997, is actual Date of Publication exclusively between Dec.31, 1996 and Feb. 1, 1997.

Boolean Constructs

Simple expressions are the fundamental building blocks of queries. However, to really construct useful queries, simple expressions need to be built into more and more complex expressions which more closely define the actual information being sought. One of the simplest means of doing this is to join multiple expressions using a Boolean Operator. GQL provides three Boolean operators, and there general syntax is:

(<BooleanOp><expression list>).

OR

The OR operator instructs that the satisfying of any single element of the expression list is sufficient for that document to be a candidate for inclusion in the results set for the query.

AND

The AND operator instructs that all elements of the expression list must be satisfied by a document in order for that document to be a candidate for inclusion in the results set for the query.

SUBTRACT

Also known as the "AndNot" operator, the Subtract operator takes a set of documents defined by an initial condition, then removes elements from that set which meet subsequent conditions. For instance, "baseball players and not yankees" would be such a condition, which would result in the set of all baseball players not on that team. This is often easier than defining a condition which consists of many other expressions which would be costly and slow to process.

Proximity Constructs

Often times it is important to find words but even more important if those words are found within a specific distance of each other. A document about George Bush is only useful if the words "George" and "Bush" occur fairly close together and frequently, otherwise it might be about George Murphy, a landscape architect specializing in shrubbery. GQL provides several proximity operators which provide such features, the general syntax of which are: (<ProxOp> [Attributes]<Expression List>). The operators supported are Document, Paragraph, Sentence, Word and Character.

Proximity operators typically function as a Boolean "And" would, the only additional constraint being the closeness of the terms found. However, it is possible to modify this behavior using the ":MATH" attribute. If ":Math" is specified, it adjusts the mechanism by which the relevance rank of documents is calculated. Currently, the only supported value is "accrue" which essentially means that "some is good, more are better" in terms of rank calculation.

Concept Constructs

Concepts serve several purposes. If Concepts are recognized by the search engine, they serve to provide simple ways of referencing queries which can be potentially very complex. Concepts also serve as placeholders within GQL so that the same expression can be made use of in two or more places in a GQL query expression without having to be redefined. The basic syntax of a concept express is:

(CONCEPT:Name<ConceptName>[<expression>].

Through the use of the various GQL search parts or expressions a user can select an expression and frame a single query which is more closely directed to the information sought than the requirements of the search engine grammar. GQL library is detailed in Appendix A and provides a grammar specification for preparing search queries.

Figure 1A:
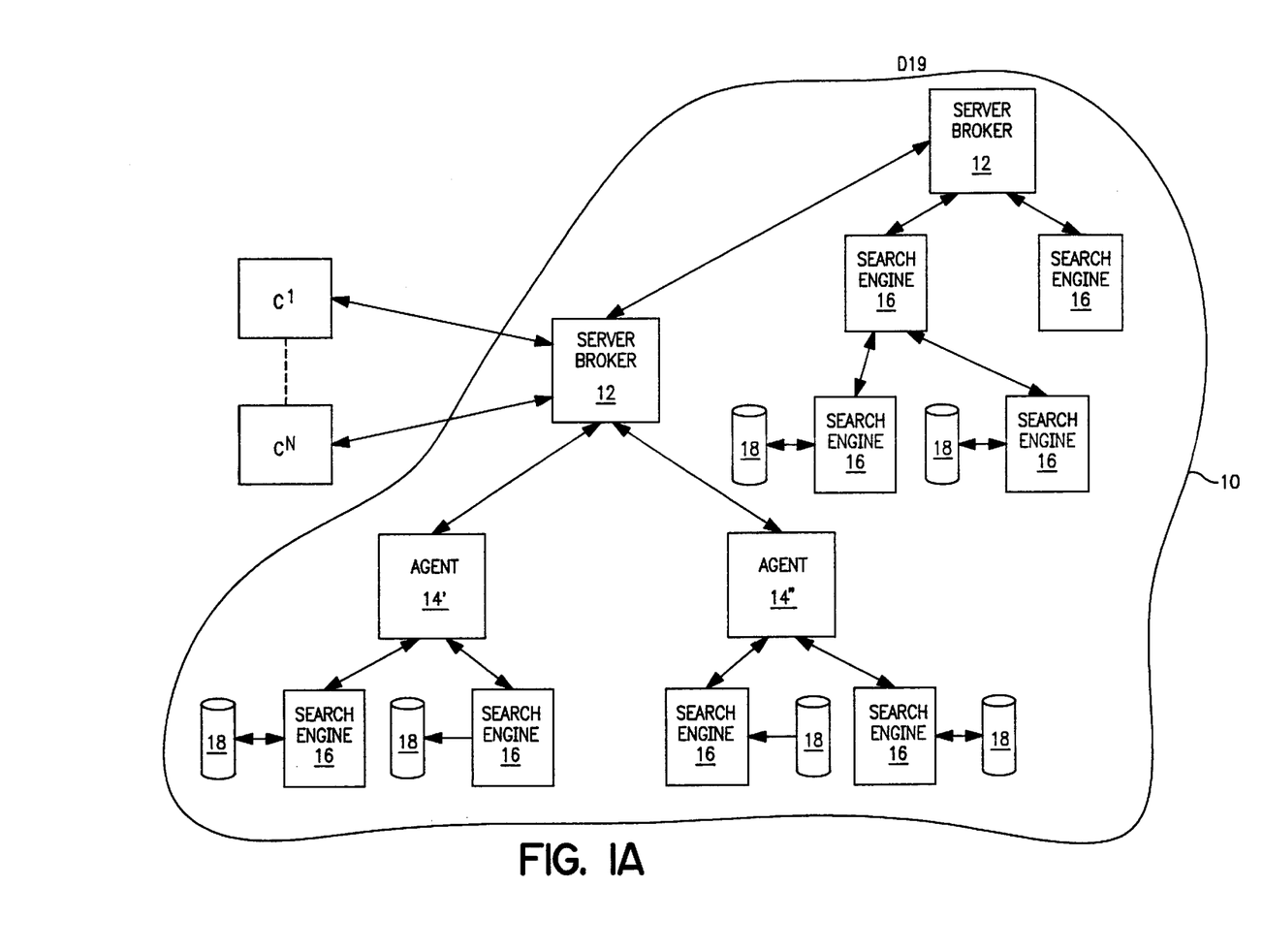
FIG. 1A is a representation of a distributed information system including client stations; broker server stations; agent stations and search engines including related databases for enabling a single query generated by a client station to receive a combined response from the search engines in accordance with the principles of the present invention.

Now turning to FIG. 1A, an information retrieval system will be described which translates single search queries expressed in GQL into target search grammars for a broad spectrum of target data repositories without the need to write custom code for such queries and provide search results for such queries in a single, fused list of relevant information. The information retrieval system of the present invention is incorporated into a Distributed Information System (DIS) 10 accessed by a plurality of clients $C^1 \ldots C^n$ through a server broker server station 12 for information retrieval purposes. The broker stations 12 are conventional DIS servers programmed to perform certain functions, as will be described hereinafter. Each client uses a workstation to generate a search request expressed in GQL which is processed by the broker 12 and transmitted to other server brokers or agent stations 14. The agent stations 12 are conventional processors programmed to perform certain functions, as will be described hereinafter. In one function, the agent stations select among search engines 16 and their related databases 18 to respond to the search request initiated by the client.

Figure 1B:
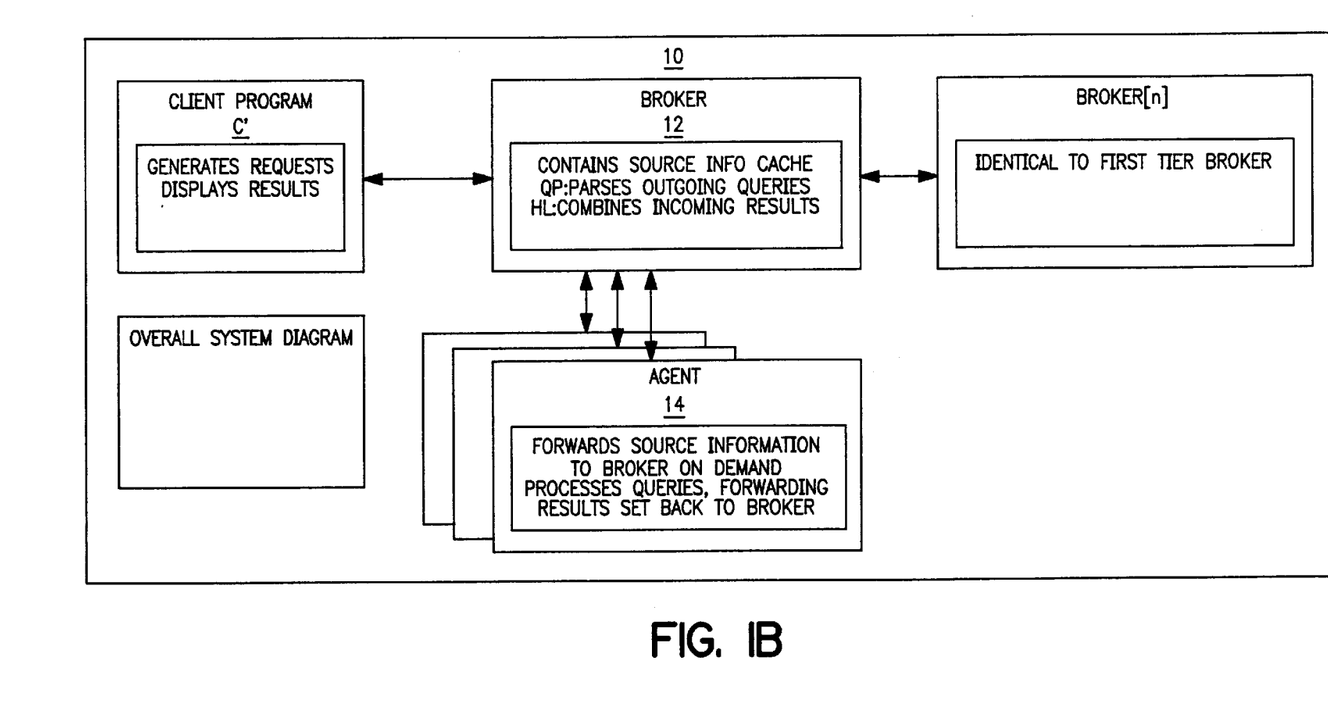
FIG. 1B is a partial listing of significant functions performed by the stations of FIG. 1A in processing a search query originated by a client station.

In FIG. 1B, the elements and functions of the client stations $C^1 \ldots$, broker servers 12, and agent stations 14 are shown for processing search requests and generating search reports in the DIS 10. Each client station $C_1 \ldots$ originates a search request formulated in GQL. The search request is designed to retrieve a certain amount of information about documents or pieces of data using one or more GQL expressions believed by the user to be the best for locating the targeted information. Conditions are expressed in GQL for documents to meet in order for the document(s) to be candidates for being returned to the client. The search request consists of the GQL conditions that documents must meet along with a set of fields to be returned for documents meeting that condition and a set of constraints which alter or adjust the behavior of the query processing. An example of the latter would be to specify a maximum number of documents to return, a minimum relevance score the documents must reach before being returned, or guidance about how the actual mechanics of the query should be processed. The results of the search requests from the multiple, dissimilar and heterogeneous searches displayed at the workstation in a single report.

Each single search query is received by a search broker 12, which performs intermediate processes in handling the search requests. The broker is similar to a distribution agent and is programmed to determine where information search requests should be sent and how many copies should go where. The broker receives search results from the agent stations and through programming combines the agent station responses into a single report which is returned to the Client. If necessary, other brokers may be contacted in order to obtain a complete picture of the available search space.

The agent 14 responds to the queries provided by the search broker. Each agent is programmed to interface with one or more search engines 16 and their related databases. The Agent parcels the search queries to search engines, according to GQL expressions, which interrogate their respective databases to identify documents which satisfy the terms of the search request. The search engines 16 and their related databases 18 are commercially available, such as Verity's Topic and Oracles' RDBM products and the like. Search results are forwarded by the agent to the broker.

Figure 2:
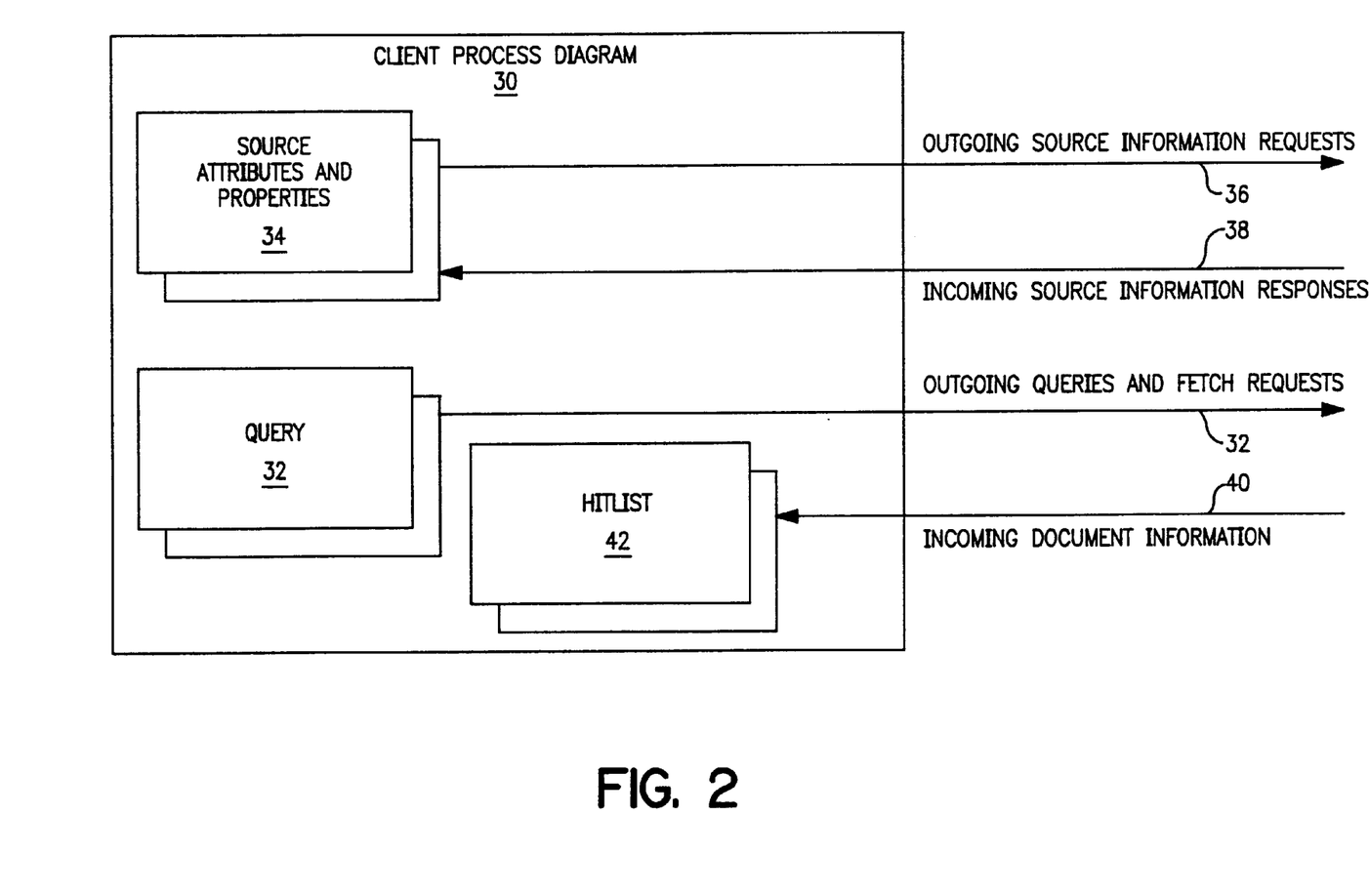
FIG. 2 is a representation of process elements and functions performed by a client process in the system of FIG. 1A.

In FIG. 2, a client process diagram 30 develops a search query 32 in terms of GQL search language. The query is transmitted as an output 32 to a search broker along with a fetch request. A fetch request is much like a query request except that the condition is defined to be<document identifier>=<value>. The processing steps are identical and there are no constraints in the request. The query consists of the GQL conditions that documents must meet along with the set of fields to be returned for documents meeting those conditions and a set of constraints which alter or adjust the behavior of the query processing. An example of the source attributes and properties 34 would be to specify a maximum number of documents to be returned; a minimum relevance score that documents much reach before being returned; or guidance about how the actual mechanics of the query should be processed. The broker provides an incoming source information response 38 which modifies document information returned by the broker as an input 40 from search results and specified in a "HitList" 24. The HitList represents the results of that query for the data sources as modified by the incoming source information response.

Figure 3:
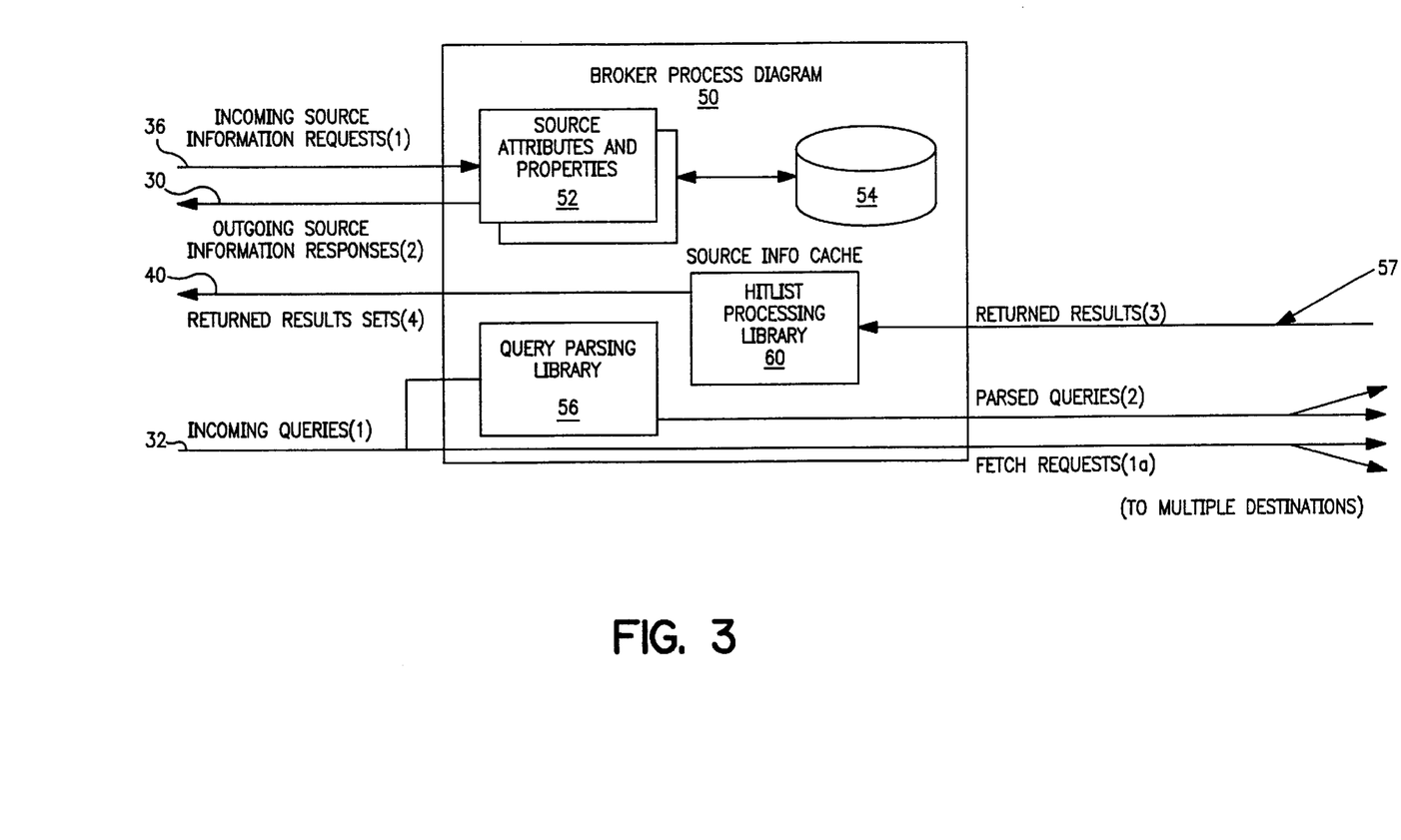
FIG. 3 is a representation of process elements and functions performed by a broker station in the system of FIG. 1A.

In FIG. 3, a broker process diagram 50 performs two functions. One function duplicates copies of the search queries and forwards them to appropriate brokers and other agents attached to that broker station. The other function receives and stores the incoming source information 36 accompanying a query in a file 52 designated by the server 12 (See FIG. 1A). The file interacts with a source information cache 54 in modifying the search results from the agents 14 (See FIG. 1A), as will be described hereinafter. Incoming queries and fetch requests 32 are used by the broker process in a Query Parsing Library 56 to perform Query Translation after checking the query for syntax problems. If the search request is without syntax problem, the GQL definition of the search is broken into individual search clauses or Partial Queries and transmitted to the agent stations 14. Query Translation identifies the actual search patterns and various operations to be performed as a set of instruction for the search engine to use in executing the Partial Query searches and combining the search results into a single report. The agent stations transmit the search results to the partial queries as an input 57 to a HitList processing library 60 which modifies and reduces the search results from the agents and brokers to whom the search query was sent in accordance with the source attributes and properties file 52. The final search result is sent from the library 60 as the output 40 to the client along with the output 36 containing the outgoing source information responses from the cache library 54.

Figure 4:
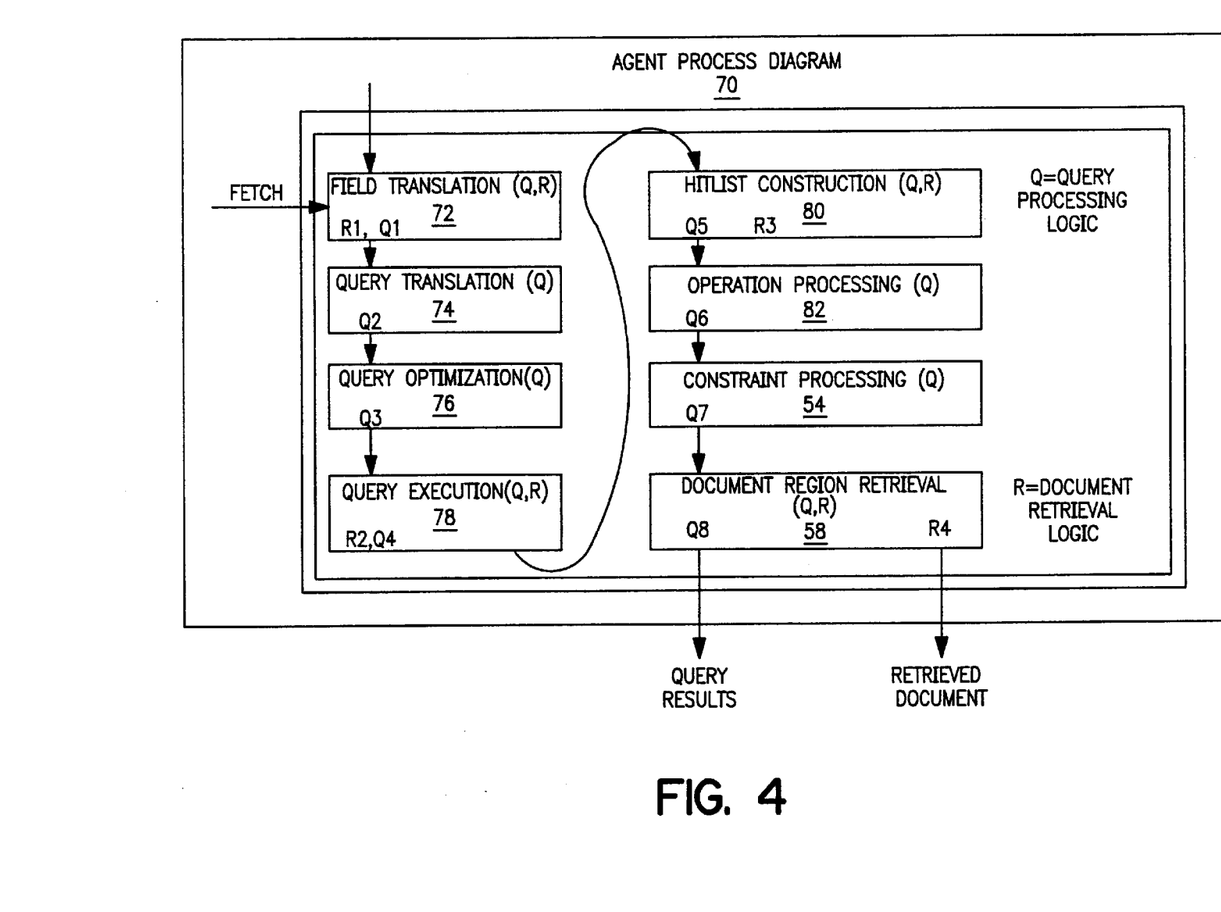
FIG. 4 is a representation of process elements and functions performed by an agent station in the system of FIG. 1A.

In FIG. 4, an agent processing diagram 70 determines which documents meet a given search condition set from the search engines responses to the Partial Queries assigned to the search engines by the agent. The agent station employs a field translation library 72 to map the fields or regions specified in the query or document retrieval request to the local data base schema. The Library 72 identifies the target engines which maybe one of several that the agent interacts with for processing of a particular partial query using Query Processing Logic (Q1) and Document Retrieval Logic (R1). As an example, consider a query where a string "cheap" is replaced by a document by "document priced less than $5". This condition may be processed by a Structured Query Language (SQL) database where the text portion of the query might be processed by some other server. During this step, the names of the fields are also modified so that the local names and formats of the field are utilized rather than "global" fields which the system uses.

A query translator 74 identifies and translates the GQL partial queries into native grammar for searching by a target search engine (which could be one of several engines) using Query Processing Logic (Q2). This process is the first step of query translation. A query optimizer 76 identifies which search operation can be modified using Query Processing Language (Q3) so that fewer accesses to the database engine are made. The partial queries are sent to the respective search engines using a query execution unit 78 and Query Processing Logic (Q4) and Document Retrieval Logic (R2). The search result provide identifiers which allow subsequent retrieval of document content.

The search engines send the search results to a HitList construction unit 50 which evaluates the set of search results and constructs a Hitlist of document as a response to the partial queries representative of the entire or single user query. The search result sets are logically modified in an Operations processing unit into a single result set for the entire query using Query Processing Logic (Q6). The single result set is subject to a constraint processing unit 54 which uses the source attributes and properties to reduce the result set to the smallest possible set of documents using Query Processing Logic (Q7). A document retrieval unit 58 retrieves the requested documents present in the result set and packages the query results and retrieved documents for return to the search broker which passes them on to the client.

Figure 5:
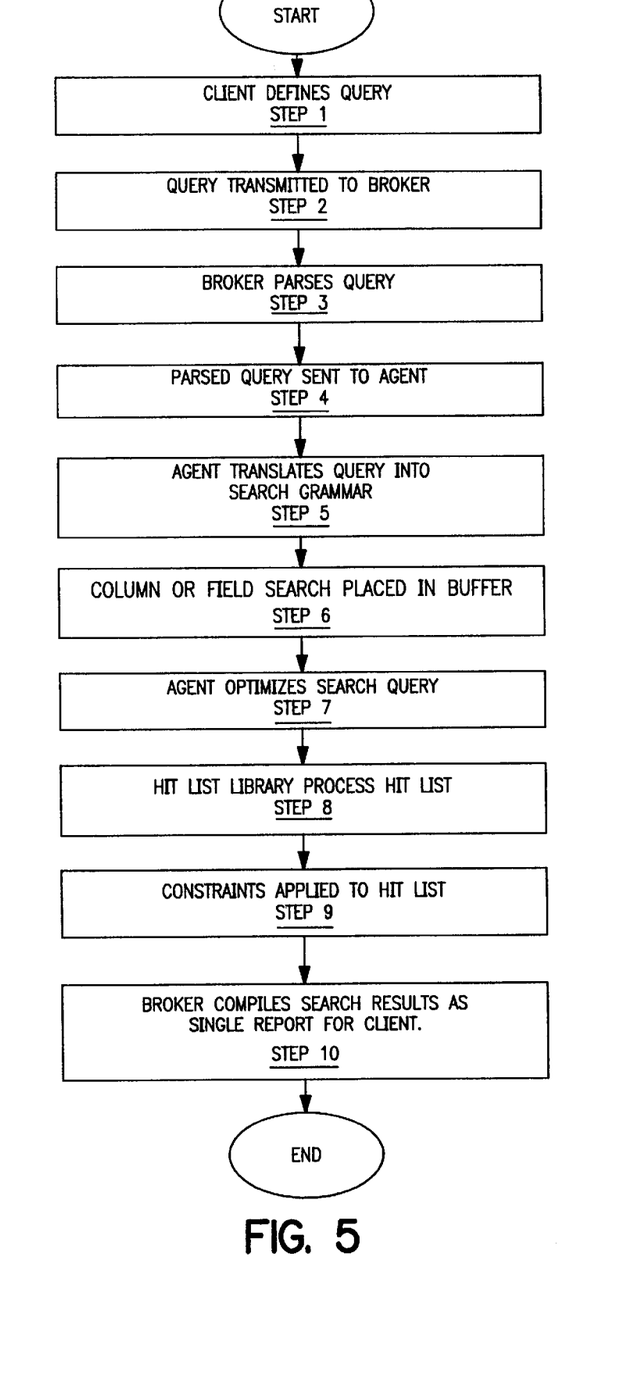
FIG. 5 is a flow diagram of a process for generating multiple responses from dissimilar, heterogenous search engines using different search grammars as a response to a single query from a client station using an improved programming language in the system of FIG. 1A.

In FIG. 5, the information retrieval process of the present invention is initiated in a step 1 in which a client or a client process phrases a search query using the GQL library (See Appendix 1). The client interface, typically a graphical user's interface allows a complex query express to be formulated from smaller and less complex GQL expressions. An example of a search query (1) expressed in GQL is: (AND(IN "DocTitle" (AND "looking "glass")) (SENTENCE (TOKEN :exact In step 2, the client forwards the search request or query defined in terms of GQL to a search broker. Along with the GQL search request, the broker can receive an optional list of behavioral constraints such as a maximum document count to return; the minimum relevance to return along with a list of destination sources to be searched, and a list of document regions/fields/columns to be returned.

In a step 3, a broker parses the GQL search definition and checks for syntax problems. If the request is found to be syntactically correct, the GQL search request is broken into individual search clauses (partial queries) and logical operations to re-combine the partial queries back into a single, larger search expression. An example of the search query (1) parsed into partial queries (PQ) and related logical operations (OP) is:

PQ1="looking'/fieldname=DocTitle
PQ2="glass"/fieldname=DocTitle
PQ2="alice"/exact
PQ4="wonderland"/exact/weight="70"
OP1=AND PQ1 PQ2
OP2=SENTENCE PQ3 PQ4
DONE=AND OP1 OP2

The list of partial queries and operations is then copied and forwarded to each of the sources of data to be searched through their related agent station in a step 4.

In a step 5, when one of the search agents receives such a search request, the agent traverses the list of partial queries, examining each of them. If a partial query is textual in nature (that is, that portion of the query is not restricted to a specific field or column of data), then the search is translated into target search grammar for a particular search engine. Since the search expressions at this level are very simple, the translation is largely driven by a simple configuration file which contains a script written in a language which defines simple, primitive reformatting operations.

In a step 6, if a partial query defines an operation which is restricted to a particular column or field (e.g., document title, for example, "Huckleberry Finn"), the agent translates that expression to an appropriate target or native search grammar, potentially modifying the field name and search values to some equivalent native form in the process. The result of this operation is a buffer which can be understood by the particular search engine for this source.

In a step 7, after all the partial queries have been translated, one final pass is made which allows the agent to combine partial queries for a given target engine into a single expression for performance optimization purposes. The calls the appropriate engine application programming interface function to perform the search and retrieve from the search a set of documents identified with which to build the search result.

In a step 8, after all the partial queries have been processed and lists of document references (called "HitLists") are associated with the partial queries, a Hitless Library combines these HitLists as directed by the logic operations associated with the partial queries. The HitList Library is sufficiently intelligent to perform the required combinations and even adjust the relevant ranks of the document references as the HitLists are processed.

In a step 9, when the final operation is processed, the resulting HitList represents the results of that query for that data source, the agent applies specified processing constraints (for example, truncating the list to end documents) and then fetches the list of data columns required in the initial request. The same scripting mechanism is utilized to translate field contents as required back into universal or canonical formats so the results being returned by the various independent data sources will have a similar appearance.

In a step 10, the query results and document lists are returned by the agent(s)/remote brokers to the broker who compiles the results in a fused report and forwards them to the client. Each search report is framed in a common format which allows the broker to prepare the fused report as a response from multiple, dissimilar, heterogenous search engines using different search grammars to the single search query.

While the invention has been shown and described in terms of a preferred embodiment, various modifications may be made therein without departing from the spirit and scope of the invention as defined in the appended claims, in which:

I claim:

1. In an information network, an information retrieval system including client stations, broker stations, agent stations and using heterogenous, dissimilar and multiple search engines, a method for providing combined search results in a common format to a single query by a client station, comprising:

a) translating the single query into search phrases contained in a programming library;

b) constructing a complex search query using the search phrases which relate to the search engines associated with data bases;

APPENDIX A

CURRENT PROPOSED GQL GRAMMAR SPECIFICATION

```
expr:      pattern_expr
          |bool_expr
          |field_expr
          |prox_expr
          |channel_expr
pattern_expr:
          STRING //A string is a token expressionw ith :weight of "50" and :stem
          |token_expr
token_expr:
          (TOKEN[:CASE] [:STEM] [:EXACT] [:WEIGHT "x"] [:WILD] [:FUZZY] [STRING]
              //CASE turns ON case sensitivity. STEM means to remove
              //suffixes from the specified search string. EXACT
              //means to search for whole words only. WEIGHT indicates
              //the relative importance of this token within the search.
              //WILD indicates that ? and * will match one and zero or
              //more arbitrary characters within a single word,
              //respectively. FUZZY means that synonyms or other similar
              //meaning words are legal as hits.
          |(BINARY STRING) //Format of BINARY token is TBI). It will be a 7-bit
              //ascii representation which includes code page info
              //probably in a base64 encoding. It will be used
              //for binary searches (images, sounds) as well as
              //non-ascii NLS searches.
bool_expr:
          ({AND|OR|SUBTRACT} expr_list expr)
bool_text_expr:
          ({AND|OR|SUBTRACT} text_expr_list text_expr)
text_expr:
          pattern_expr
          |bool_text_expr
          |prox_expr
          |channel_text_expr
text_expr_list:
          text_expr
          |text_expr_list text_expr
expr_list:
          expr
          |expr_list expr
field_expr:
          ({START|EQ|IN|END} field_name text_expr)
          |({GT|LT|GTE|LTE} field_name value)
          |({BETWEENI|BETWEENE} field_name value value)
prox_expr:
          (prox_op [:COUNT "x"] [:ORDER] [:MATH "y"] expr_list expr)
          //"y" suggests the mathematical approach used to calculate relevance scores.
prox_op:
          DOCUMENT
          |PARAGRAPH
          |SENTENCE
          |WORD
          |CHARACTER
channel_expr:
          (CHANNEL:NAME "x" [expr])
channel_text_expr:
          (CHANNEL :NAME "x" [text_expr])
``` c) transmitting the query to a broker station which checks the query for syntax errors; parses the associated query into individual search or partial queries terms and associated logical operation for combining the partial searches;

d) transmitting the individual or partial queries to agent stations for distribution to the search engines, each search engine translating the partial queries into database search grammar for searching purposes and retrieving search information in the form of a "Hit List" related to the query;

e) combining the "Hit List" in accordance with the logical operations associated with the partial queries and any constraints specified in the query to generate a search result having a common format appearance with other search engines;

f) combining and forwarding the "Hit List" results from the associated search engines to the broker station; and g) generating and forwarding to the requesting client station a single response from the heterogeneous, dissimilar, multiple search engines to the single query.

2. The method of claim 1 further comprising the step of:
a) performing query translation into partial queries using a query parsing library.

3. The method of claim 2 further comprising the step of:
a) modifying and reducing the search results from agent and broker stations using a "Hit List" processing library.

4. The method of claim 3 further comprising the step of:
a) determining which documents meet a given search condition set from the search engines responses to the partial queries assigned to the search engines by the agent station.

5. The method of claim 4 further comprising the step of:
a) identifying search patterns and search operations to be performed by an associated search engine using a Query Translator.

6. The method of claim 5 further comprising the step of:
a) mapping the fields or regions specified by the partial queries to a search engine database using a field translation library.

7. The method of claim 6 further comprising the step of:
a) translating the partial queries into a search grammar associated with the search engine associated with the partial query using a query translator.

8. The method of claim 7 further comprising the step of:
a) minimizing accesses to the database for search purposes using a query optimizer.

9. The method of claim 8 further comprising the step of:
a) logically combining search results from the search engines in accordance with the single search query using an operation processing unit.

10. The method of claim 9 further comprising the step of:
a) reducing the search results of the associated search engine using source attributes and properties of the single query a constraint processing unit.

11. In an information network, an information retrieval system using heterogenous, dissimilar and multiple search engines and providing combined search results in a common format to a single query by a client station, comprising:

a) means for translating the single query into search phrases contained in a programming library;

b) means for constructing a complex search query using the search phrases which relate to the search engines associated with data bases;

c) means for transmitting the query to a broker station which checks the query for syntax errors; parses the associated query into individual search or partial queries terms and associated logical operation for combining the partial searches;

d) means for transmitting the individual or partial queries to agent stations for distribution to the search engines, each search engine translating the partial queries into database search grammar for searching purposes and retrieving search information in the form of a "Hit List" related to the query;

e) means for combining the "Hit List" in accordance with the logical operations associated with the partial queries and any constraints specified in the query to generate a search result having a common format appearance with other search engines;

f) means in each agent station for combining and forwarding the "Hit List" results from the associated search engines to the broker station; and g) means for generating and forwarding to the requesting client station a single response from the heterogeneous, dissimilar, multiple search engines to the single query.

12. The information retrieval system of claim 11 further comprising:
a) a query parsing library for performing query translation into partial queries.

13. The information system of claim 12 further comprising:
a) "Hit List" processing library for modifying and reducing the search results from agent and broker stations.

14. The information retrieval system of claim 13 further comprising:
a) means for determining which documents meet a given search condition set from the search engines responses to the partial queries assigned to the search engines by the agent station.

15. The information retrieval system of claim 14 further comprising:
a) Query translation means for identifying search patterns and search operations to be performed by an associated search engine.

16. The information retrieval system of claim 15 further comprising:
a) a field translation library for mapping the fields or regions specified by the partial queries to a search engine database.

17. The information retrieval system of claim 16 further comprising:
a) a query translator for translating the partial queries into a search grammar associated with the search engine associated with the partial query.

18. The information retrieval system of claim 17 further comprising:
a) a query optimizer for minimizing accesses to the database for search purposes.

19. The information retrieval system of claim 18 further comprising:
a) an operation processing unit for logically combining search results from the search engines in accordance with the single search query.

20. The information retrieval system of claim 19 further comprising:
a) a constraint processing unit for reducing the search results of the associated search engine using source attributes and properties of the single query.

* * * * *

UNITED STATES PATENT AND TRADEMARK OFFICE
CERTIFICATE OF CORRECTION

PATENT NO.   : 6,009,422
DATED        : December 28, 1999
INVENTOR(S)  : Stephen Matthew Ciccarelli It is certified that error appears in the above-identified patent and that said Letters Patent is hereby corrected as shown below:

Title page,
Item [75], change the spelling of the inventor's name to -- Stephen Matthew Ciccarelli --.

Signed and Sealed this

Thirtieth Day of October, 2001

Attest:

*Nicholas P. Godici*

NICHOLAS P. GODICI
*Attesting Officer*      *Acting Director of the United States Patent and Trademark Office*